(12) United States Patent
Sheridan et al.

(10) Patent No.: US 7,131,703 B1
(45) Date of Patent: Nov. 7, 2006

(54) PORTABLE RESTRAINING CHILD SAFETY VEST FOR VEHICLES

(76) Inventors: Colleen E Sheridan, 742 Mill Hill Ter., Southport, CT (US) 06890; Ellen K Siegel, 165 Butternut La., Southport, CT (US) 06890

( * ) Notice: Subject to any disclaimer, the term of this patent is extended or adjusted under 35 U.S.C. 154(b) by 0 days.

(21) Appl. No.: 10/931,019

(22) Filed: Aug. 31, 2004

(51) Int. Cl.
*A62B 35/00* (2006.01)
(52) U.S. Cl. .................. 297/465; 297/485
(58) Field of Classification Search ............ 297/465, 297/485; 280/801.1; 2/102, 108
See application file for complete search history.

(56) References Cited

U.S. PATENT DOCUMENTS

| | | | |
|---|---|---|---|
| 4,026,245 A * | 5/1977 | Arthur | 297/465 |
| 4,674,800 A * | 6/1987 | Ensign | 297/465 |
| 5,074,588 A | 12/1991 | Huspen | |
| 5,080,191 A * | 1/1992 | Sanchez | 182/3 |
| 5,161,258 A | 11/1992 | Coltrain | |
| 5,301,371 A | 4/1994 | Chao | |
| 5,429,418 A * | 7/1995 | Lipper et al. | 297/465 |
| 5,544,363 A * | 8/1996 | McCue et al. | 2/102 |
| 5,730,498 A * | 3/1998 | Hanson et al. | 297/465 |
| 5,733,014 A * | 3/1998 | Murray | 297/485 |
| 5,926,846 A | 7/1999 | Segal | |
| 6,007,156 A * | 12/1999 | Chang | 297/465 |
| 6,314,578 B1 | 11/2001 | Masuda et al. | |
| D453,398 S | 2/2002 | Masuda | |
| 6,601,916 B1 * | 8/2003 | Kamiki | 297/250.1 |
| 2004/0169411 A1 * | 9/2004 | Murray | 297/486 |

FOREIGN PATENT DOCUMENTS

DE 4401702 A1 * 8/1994

OTHER PUBLICATIONS

WO 93/05986 Jeong, Sook.*

* cited by examiner

*Primary Examiner*—Peter M. Cuomo
*Assistant Examiner*—Sarah B. McPartlin
(74) *Attorney, Agent, or Firm*—Michael I. Kroll

(57) ABSTRACT

An apparatus for a safety vest for a portable restraining system designed to protect a child 12 in the back seat of a taxi cab, limousine, or car should a child safety seat not be available or practical. The device 10 provides means for separating a seat belt comprising a lap 18 and shoulder 20 belt for either side of a left or right seated passenger, the means also insuring the continued separation of the belts during use; a first and second closure means comprising a zipper 28 and a hook and loop fastening device 30 that will prevent possible fouling of the zipper 28 due to g-forces at 22 occurring during an accident and a quick release 24 which can be initiated by small children as opposed to mechanical locks that they may be unfamiliar with.

11 Claims, 8 Drawing Sheets

PORTABLE RESTRAINING CHILD SAFETY VEST FOR VEHICLES

BACKGROUND OF THE INVENTION

1. Field of the Invention

The present invention relates generally to Vehicle safety equipment for children and, more specifically, to a safety vest, portable restraining system is designed to protect a child in the back seat of a taxi cab, limousine, or car should a child safety seat not be available or practical. The device provides means for separating a seat belt comprising a lap and shoulder belt for either side a left or right seated passenger, said means also insuring the continued separation of the belts during use; a first and second closure means comprising a zipper and a hook and loop fastening device that will prevent possible fouling of the zipper due to g-forces occurring during an accident and a quick release, which can be initiated by small children as opposed to mechanical locks that they may be unfamiliar with.

2. Description of the Prior Art

There are other child restraining devices designed for the same purpose. Typical of these is U.S. Pat. No. 5,074,588 issued to Huspen on Dec. 24, 1991.

Another patent was issued to Coltrain on Nov. 10, 1992 as U.S. Pat. No. 5,161,258. Yet another U.S. Pat. No. 5,301,371 was issued to Chao on Apr. 12, 1994 and still yet another was issued on Jul. 27, 1999 to Segal as U.S. Pat. No. 5,926,846.

Another patent was issued to Masuda, et al. on Nov. 13, 2001 as U.S. Pat. No. 6,314,578. Yet another U.S. Pat. No. D453,398 was issued to Masuda on Feb. 5, 2002.

U.S. Pat. No. 5,074,588

Inventor: Fred Huspen

Issued: Dec. 24, 1991

A child safety restraint for a vehicle seat having a safety belt includes a stress plate having at least one safety belt slot for receiving the safety belt to secure the restraint to the seat, at least one harness slot and a harness for releasably securing a wearer's back to the stress plate, the harness including a pair of shoulder straps and a crotch strap secured at one end to the shoulder straps, the shoulder straps being configured to each pass through a respective harness slot in the plate so that the harness is slidably engaged on the plate.

U.S. Pat. No. 5,161,258

Inventor: Lori A. Coltrain

Issued: Nov. 10, 1992

A child is adapted to be zipped into a sleeveless vest which coacts with the lap and shoulder belts of a vehicle safety harness to restrain the child in the vehicle. The back side of the vest includes a generally horizontal loop for receiving the lap belt and further includes a vertically inclined loop for receiving the shoulder belt. Both loops are adapted to be opened and closed by zippers in order to enable the belts to be easily placed into and removed from the loops.

U.S. Pat. No. 5,301,371

Inventor: Wen-Chung Chao

Issued: Apr. 12, 1994

A safety vest to be used in a car and more particularly a safety vest to be worn by a child in a car; the safety vest comprises a vest portion and a plurality of safety belts being fixed inside the lamina of the vest portion; the front opening of the vest portion is furnished with buckle assemblies whereby the safety vest can be put securely on a child. The back of the vest has two slots, through which a car safety (or seat) belt is inserted so as to allow the safety vest fixedly mounted on car seat; since the car safety belt and the safety vest are assembled together, a larger restraining area can be formed and applied to a child, and in case of emergency or accident, the injury to a child would be minimized.

U.S. Pat. No. 5,926,846

Inventor: Amy R. Segal

Issued: Jul. 27, 1999

Safety vest for use in turbulent environments. The vest is made of a breathable material and sized to fit a child. A strap is securely affixed to the vest and sized to encircle a person so that the vest and a child wearing the vest may be secured to the person. The use of the vest will prevent a child from being ripped from a parent's arms during, for example, severe air turbulence.

U.S. Pat. No. 6,314,578

Inventor: Mitsunori Masuda, et al.

Issued: Nov. 23, 2001

The present invention relates to child protecting clothes for vehicles, used with a seat belt so as to protect a child sitting on a seat of an automobile from a shock of an accident. As compared with a related art child seat, the child protecting clothes have the following advantages. The protective clothes can be put on a child as the safety of the child is secured; manufactured at a low cost; and give the person wearing the clothes a certain degree of freedom of physical movement. A back member of the protective clothes is formed double of an inner cloth portion and an outer cloth portion. A seatbelt can be inserted between the inner and outer cloth portions of the back member.

U.S. Pat. No. D453,398

Inventor: Mitsunori Masuda

Issued: Feb. 5, 2002

The ornamental design for, a child-protecting vest to be used in the vehicle, as shown and described.

While these safety devices may be suitable for the purposes for which they were designed, they would not be as suitable for the purposes of the present invention, as hereinafter described.

The present invention is a safety vest restraining system designed to protect a child in the back seat of a taxi cab, limousine, or car should a child safety seat not be available or practical. The device provides means for separating a seat belt comprising a lap and shoulder belt for either a left or right seated passenger, said means also insuring the continued separation of the belts during use. A first and second closure means comprising a zipper and hook and loop fastening device will prevent possible fouling of the zipper due to g-forces occurring during an accident and a quick release, which can be initiated by small children as opposed to mechanical locks that they may be unfamiliar with.

SUMMARY OF THE PRESENT INVENTION

The present invention discloses a safety vest for a portable restraining system designed to protect a child in the back seat of a taxi cab, limousine, or car should a child safety seat not be available or practical. The device provides means for separating a seat belt comprising a lap and shoulder belt for either side of a left or right seated passenger, the means also insuring the continued separation of the belts during use; a first and second closure means comprising a zipper and hook and loop fastening device that will prevent possible fouling of the zipper due to g-forces occurring during an accident and a quick release which can be initiated by small children as opposed to mechanical locks that they may be unfamiliar with.

A primary object of the present invention is to provide a safety vest, portable restraining system designed to protect a child in the back seat of a taxi cab, limousine, or car should a child safety seat not be available or practical.

Another object of the present invention is to provide a safety vest that provides means for separating a seat belt comprising a lap and shoulder belt for either a left or right seated passenger.

Yet another object of the present invention is to provide a safety vest that insures the continued separation of the belts during use. A first and second closure means comprising a zipper and hook and loop fastening device will prevent possible fouling of the zipper due to g-forces occurring during an accident and a quick release, which can be initiated by small children as opposed to mechanical locks that they may be unfamiliar with.

Additional objects of the present invention will appear as the description proceeds.

The present invention overcomes the shortcomings of the prior art by providing a safety vest, portable restraining system designed to protect a child in the back seat of a taxi cab, limousine, or car should a child safety seat not be available or practical. The device provides means for separating a seat belt comprising a lap and shoulder belt for either a left or right seated passenger, said means also insuring the continued separation of the belts during use. A first and second closure means comprising a zipper and hook and loop fastening device will prevent possible fouling of the zipper due to g-forces occurring during an accident and a quick release, which can be initiated by small children as opposed to mechanical locks that they may be unfamiliar with.

The foregoing and other objects and advantages will appear from the description to follow. In the description reference is made to the accompanying drawings, which form a part hereof, and in which is shown by way of illustration-specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which.

LIST OF REFERENCE NUMERALS

Figure 1:
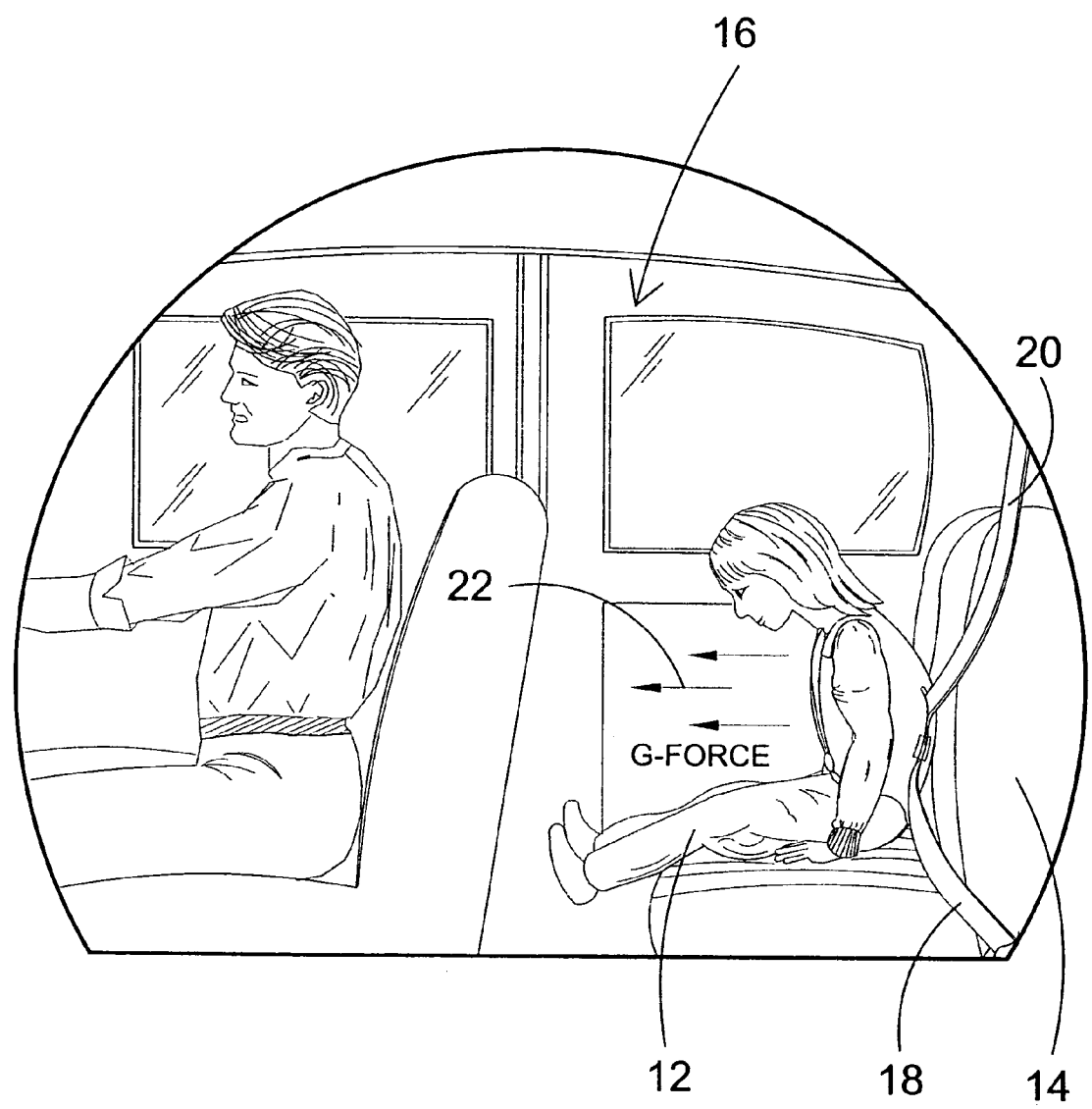
FIG. 1 is an illustrative view of the present invention in use.

With regard to reference numerals used, the following numbering is used throughout the drawings.

10 present invention
12 child
14 back seat
16 taxi cab
18 lap belt
20 shoulder belt
22 arrows
24 quick release
26 hook and loop material flap
28 zipper
30 hook and loop material flap
32 crotch harness
34 snaps
36 belt slot

DETAILED DESCRIPTION OF THE PREFERRED EMBODIMENT

The following discussion describes in detail one embodiment of the invention. This discussion should not be construed, however, as limiting the invention to those particular embodiments since practitioners skilled in the art will recognize numerous other embodiments as well. For a definition of the complete scope of the invention, the reader is directed to the appended claims.

Turning to FIG. 1, shown therein is an illustrative view of the present invention 10 in use. The present invention 10 discloses a safety vest for a portable restraining system designed to protect a child 12 in the back seat 14 of a taxi cab 16, limousine, or car should a child safety seat not be available or practical. The device 10 provides means for separating a seat belt comprising a lap 18 and shoulder 20 belt for either a left or right seated passenger wherein the means also insures the continued separation of the belts during use. A first and second closure means comprising a zipper and hook and loop fastening device will prevent possible fouling of the zipper due to g-forces at arrows 22 occurring during an accident and a quick release, which can be initiated by small children 12 as opposed to mechanical locks that they may be unfamiliar with. Shoulder and side hook and loop fastening devices adjust the size to better fit children 12.

Figure 2:
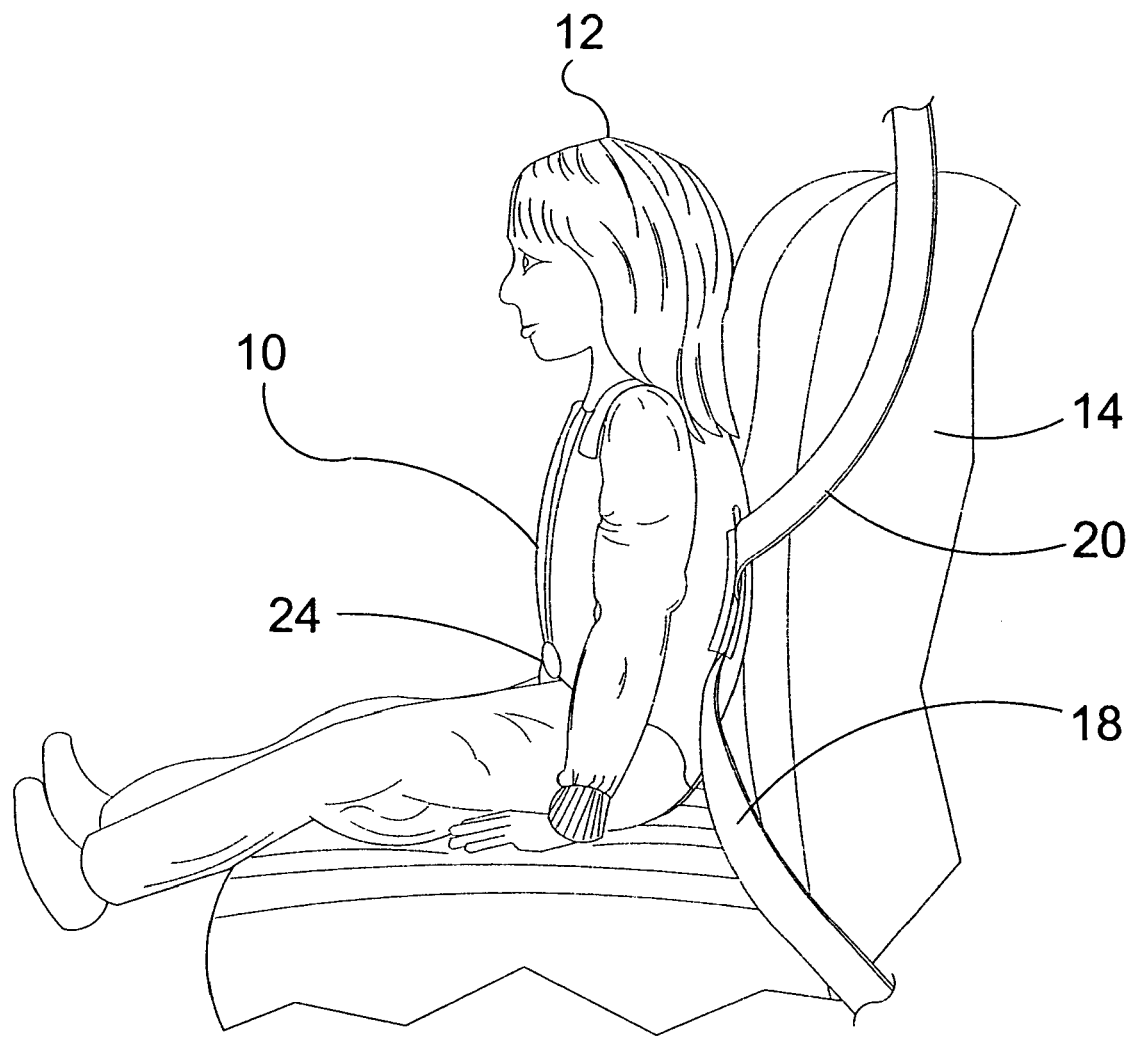
FIG. 2 is an illustrative view of the present invention in use.

Turning to FIG. 2, shown therein is an illustrative view of the present invention 10 in use. Shown is the present invention 10 disclosing a safety vest, portable restraining system designed to protect a child 12 in the back seat 14 of a taxi cab, limousine, or car should a child safety seat not be available or practical. The device 10 provides means for separating a seat belt comprising a lap 18 and shoulder 20 belt for either left or right seated passenger, the means also insuring the continued separation of the belts during use. A first and second closure means comprising a zipper and hook and loop fastening device will prevent possible fouling of the zipper due to g-forces occurring during an accident and a quick release 24, which can be initiated by small children as opposed to mechanical locks that they may be unfamiliar with.

Figure 3:
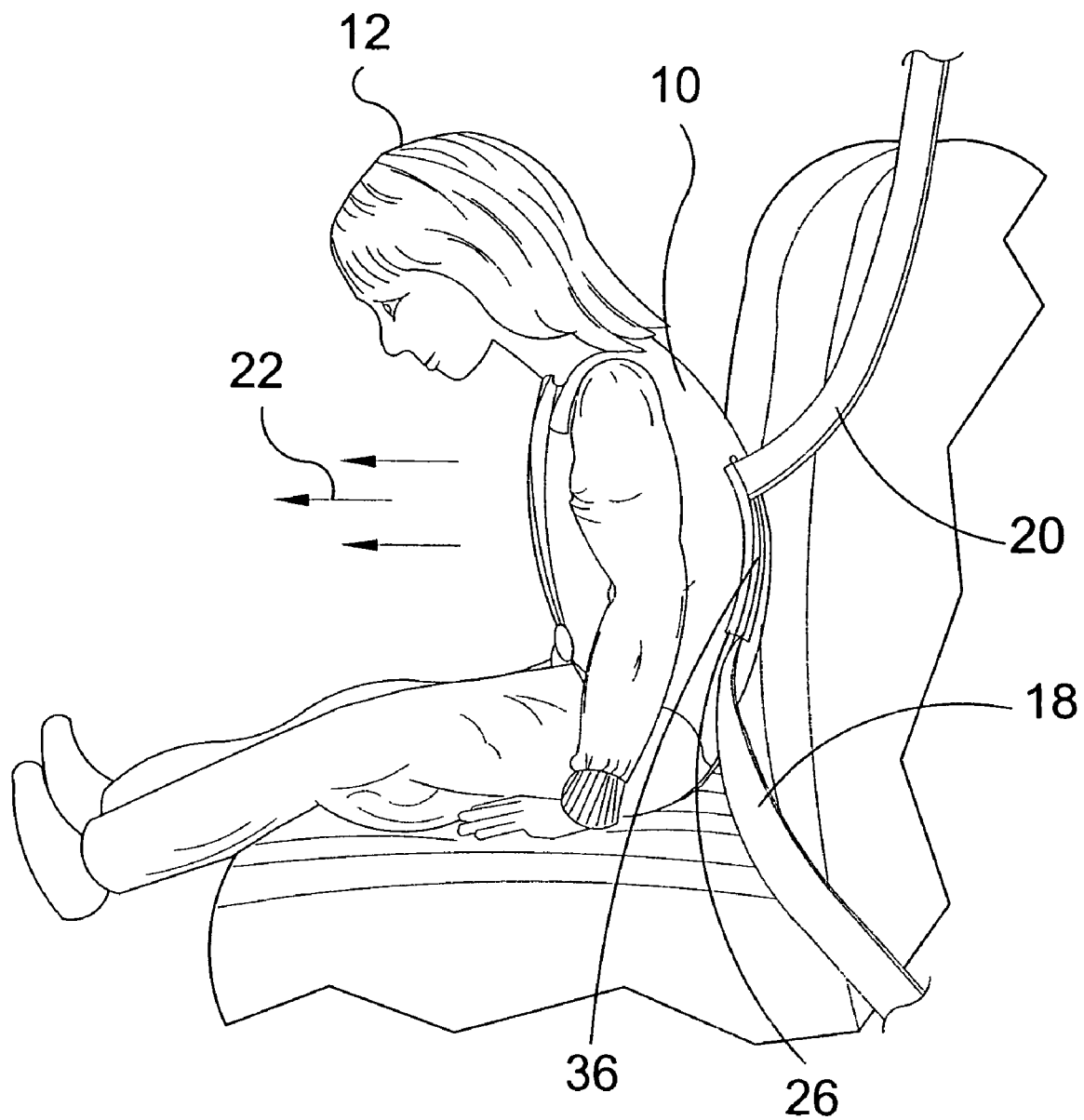
FIG. 3 is an illustrative view of the present invention in use.

Turning to FIG. 3, shown therein is an illustrative view of the present invention 10 in use. Shown is the present invention 10 disclosing a safety vest, portable restraining system designed to protect a child 12 in the back seat of a taxi cab, limousine, or car should a child safety seat not be available or practical. The device 10 provides means for separating a seat belt comprising a lap 18 and shoulder 20 belt for either a left or right seated passenger, the means also insuring the continued separation of the belts during use. A first and second closure means comprising a zipper and hook and loop fastening device will prevent possible fouling of the zipper due to g-forces 22 occurring during an accident and a quick release, which can be initiated by small children as opposed to mechanical locks that they may be unfamiliar with. Also shown is belt slot 36 with a hook and loop material flap or cover 26.

Figure 4:
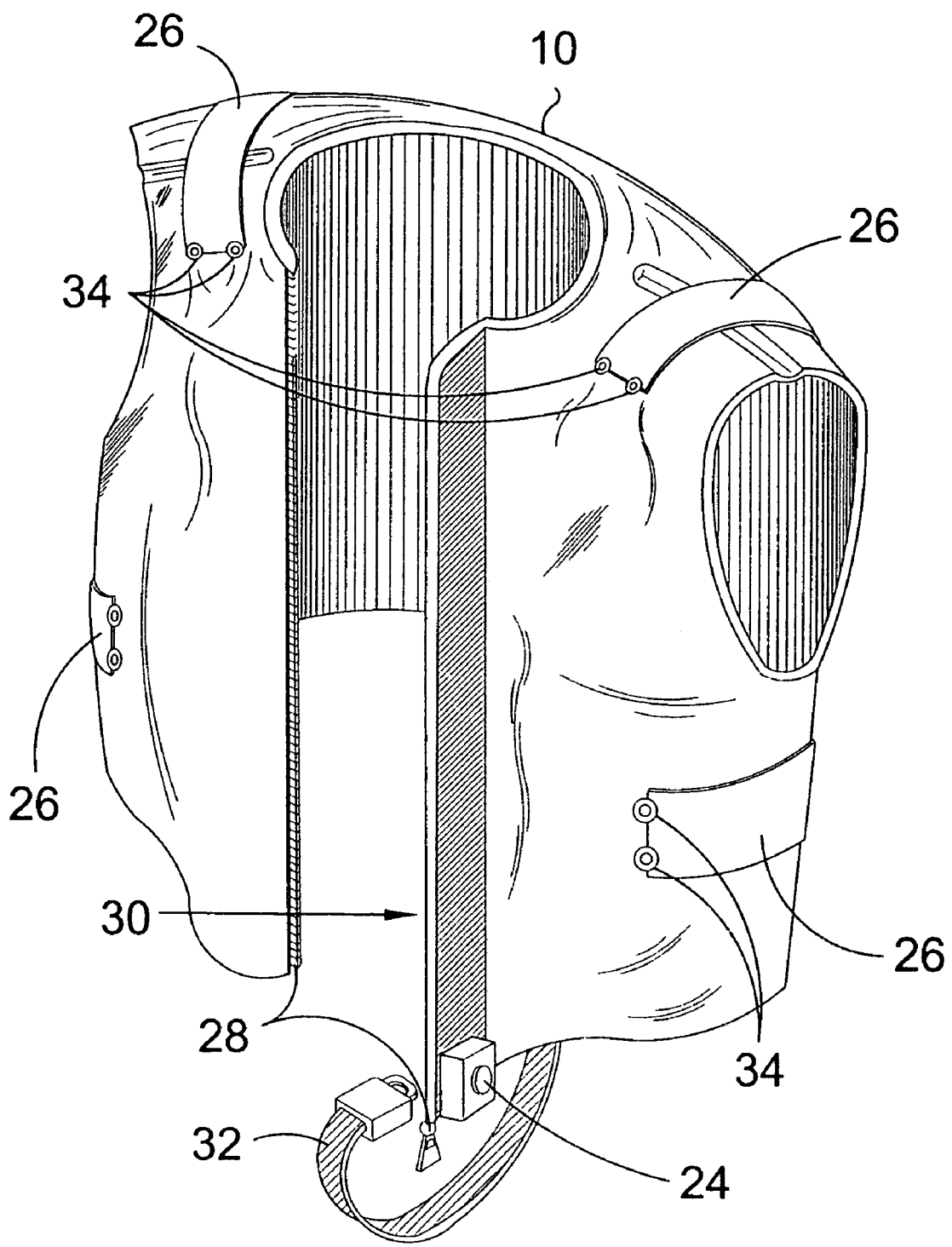
FIG. 4 is a perspective view of the front portion of the present invention.

Turning to FIG. 4, shown therein is a perspective view of the front portion of the present invention 10. Shown is a perspective frontal view of the present invention 10 disclosing a safety vest, portable restraining system designed to protect a child in the back seat of a taxi cab, limousine, or car should a child safety seat not be available or practical. The device 10 provides means for separating a seat belt comprising a lap and shoulder belt for either a left or right seated passenger, the means also insuring the continued separation of the belts during use. A first and second closure means comprising a zipper 28 and hook and loop fastening device 30 will prevent possible fouling of the zipper 28 due to g-forces occurring during an accident and a quick release 24, which can be initiated by small children as opposed to mechanical locks that they may be unfamiliar with. Also shown are multiple hook and loop material flaps 26, crotch harness 32 and multiple snaps 34.

Figure 5:
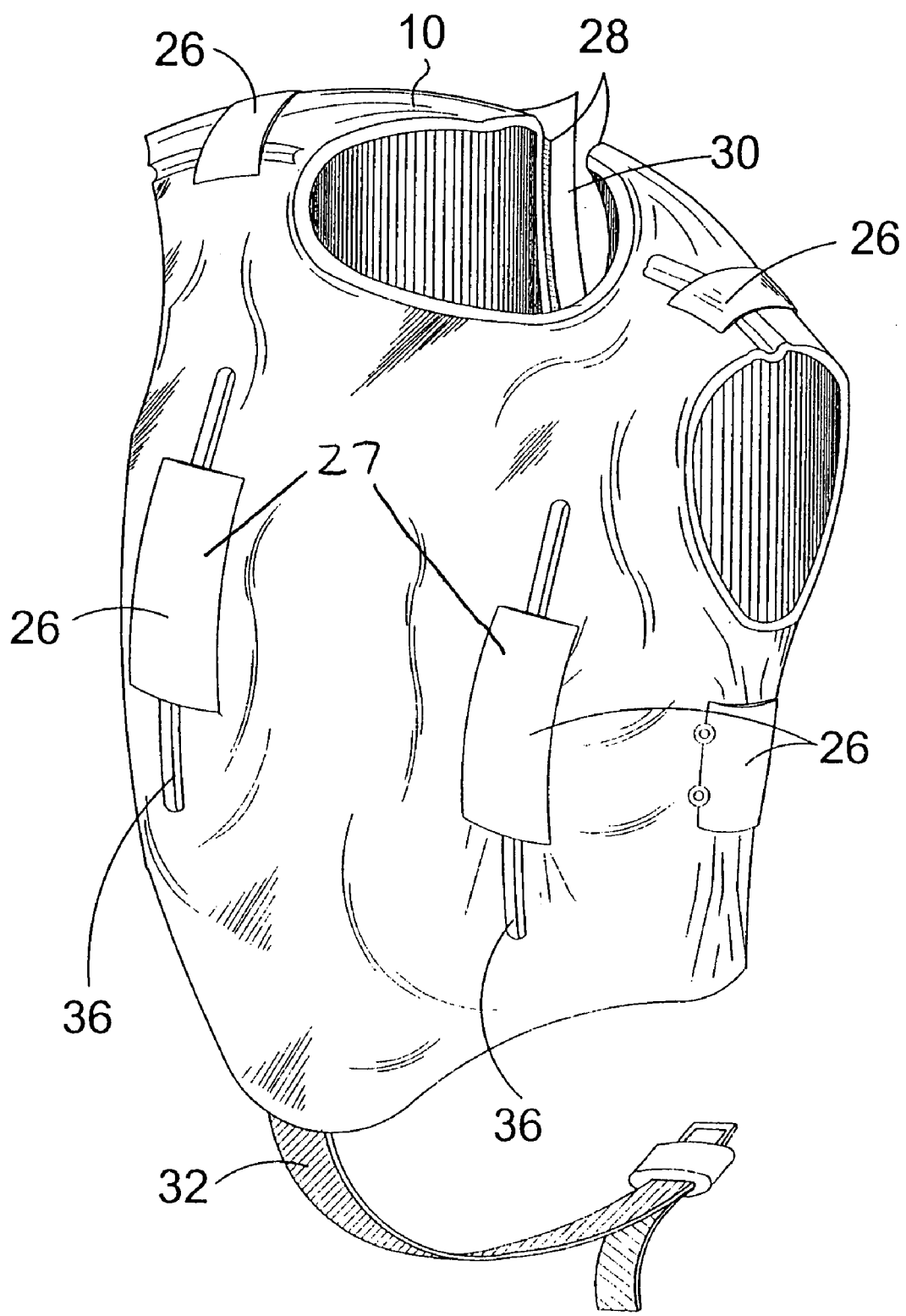
FIG. 5 is a perspective view of the rear portion of the present invention.

Turning to FIG. 5, shown therein is a perspective view of the rear portion of the present invention 10. Shown is a perspective rear view of the present invention 10 disclosing a sleeveless safety vest for a portable restraining system designed to protect a child in the back seat of a taxi cab, limousine, or car should a child safety seat not be available or practical. The device 10 provides means 27 for separating a seat belt comprising a lap and shoulder belt for either a left or right seated passenger, the means also insuring the continued separation of the belts during use. A first and second closure means comprising a zipper 28 and Velcro® flaps 30 will prevent possible fouling of the zipper 28 due to g-forces occurring during an accident and a quick release, which can be initiated by small children as opposed to mechanical locks that they may be unfamiliar with. Also shown are vertical belt slots 36, hook and loop flaps 26, and crotch harness 32. The flaps 26 extend from one portion of slot 36 across to the opposite portion of the slot.

Figure 6:
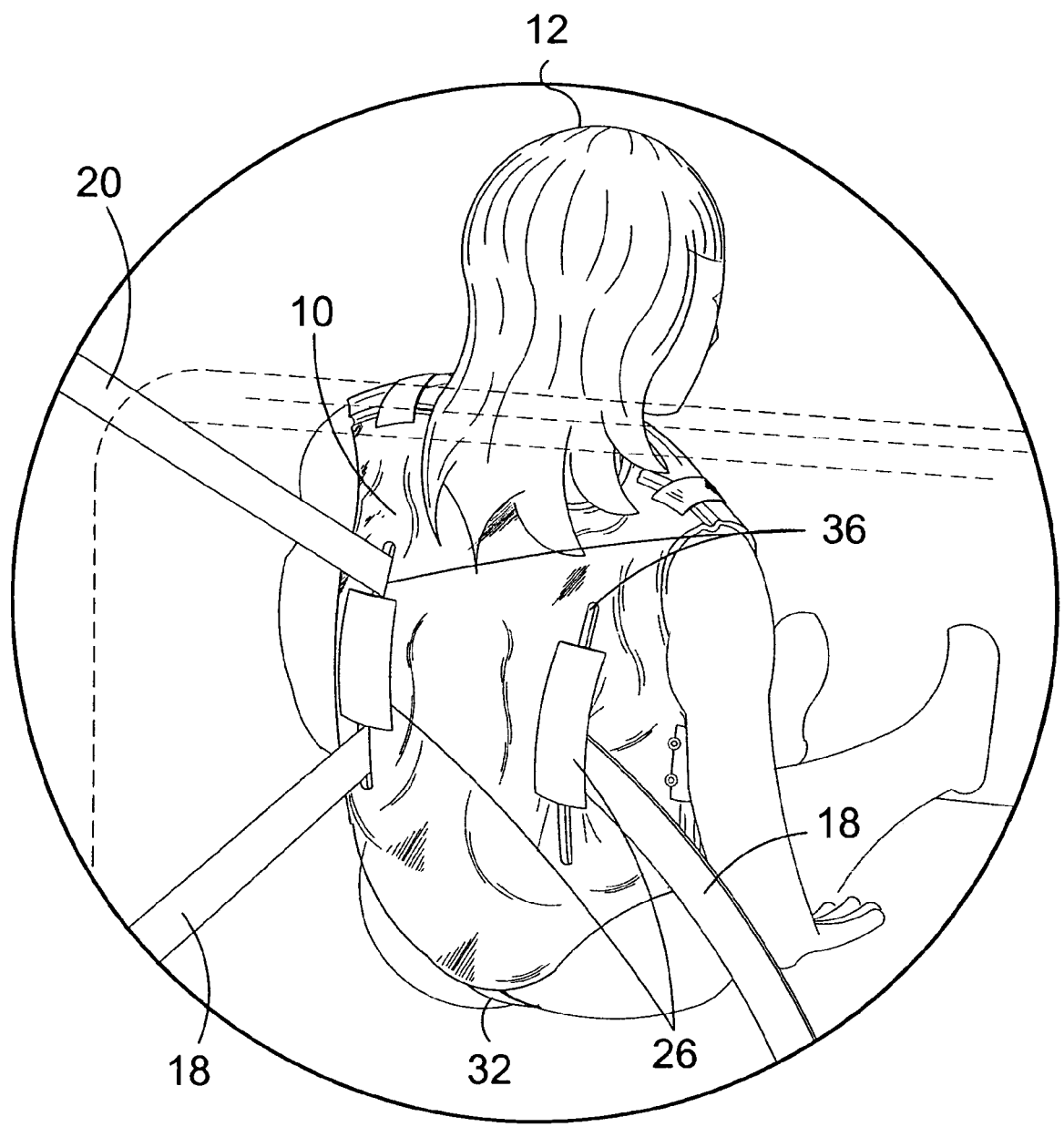
FIG. 6 is a detail view of the rear portion of the present invention in use.

Turning to FIG. 6, shown therein is a detail view of the rear portion of the present invention 10 in use. Shown is a perspective rear view of the present invention 10 disclosing a safety vest, portable restraining system designed to protect a child 12 in the back seat of a taxi cab, limousine, or car should a child safety seat not be available or practical. The device 10 provides means for separating a seat belt comprising a lap 18 and shoulder 20 belt for either a left or right seated passenger, the means also insuring the continued separation of the belts during use wherein the belts 18, 20 pass through slots 36 from the outside to the inside of the safety vest and then are reconnected on the inside of the vest. A first and second closure means comprising a zipper and hook and loop fastening device will prevent possible fouling of the zipper due to g-forces occurring during an accident and a quick release, which can be initiated by small children as opposed to mechanical locks that they may be unfamiliar with. Also shown are belt slot 36, crotch harness 32, and multiple hook and loop material flaps 26 located on the shoulders, sides and belt slots.

Figure 7:
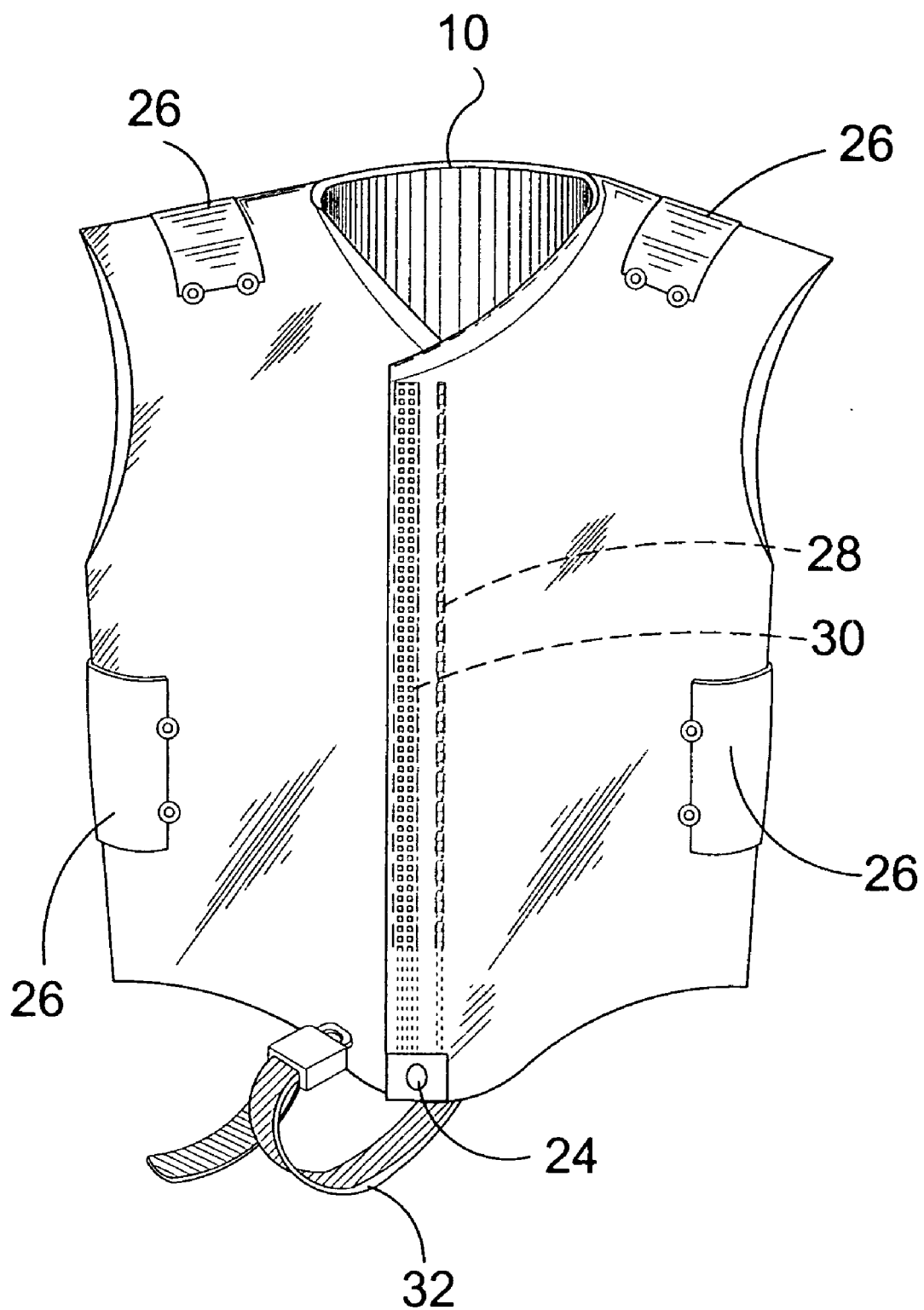
FIG. 7 is a front view of the present invention.

Turning to FIG. 7, shown therein is a front view of the present invention 10. Shown is a front view of the present invention 10 disclosing a safety vest, portable restraining system is designed to protect a child in the back seat of a taxi cab, limousine, or car should a child safety seat not be available or practical. The device 10 provides means for separating a seat belt comprising a lap and shoulder belt for either a left or right seated passenger, the means also insuring the continued separation of the belts during use. A first and second closure means comprising a zipper 28 and hook and loop fastening device 30 will prevent possible fouling of the zipper due to g-forces occurring during an accident and a quick release 24, which can be initiated by small children as opposed to mechanical locks that they may be unfamiliar with. Also shown are flaps 26 and crotch harness 32.

Figure 8:
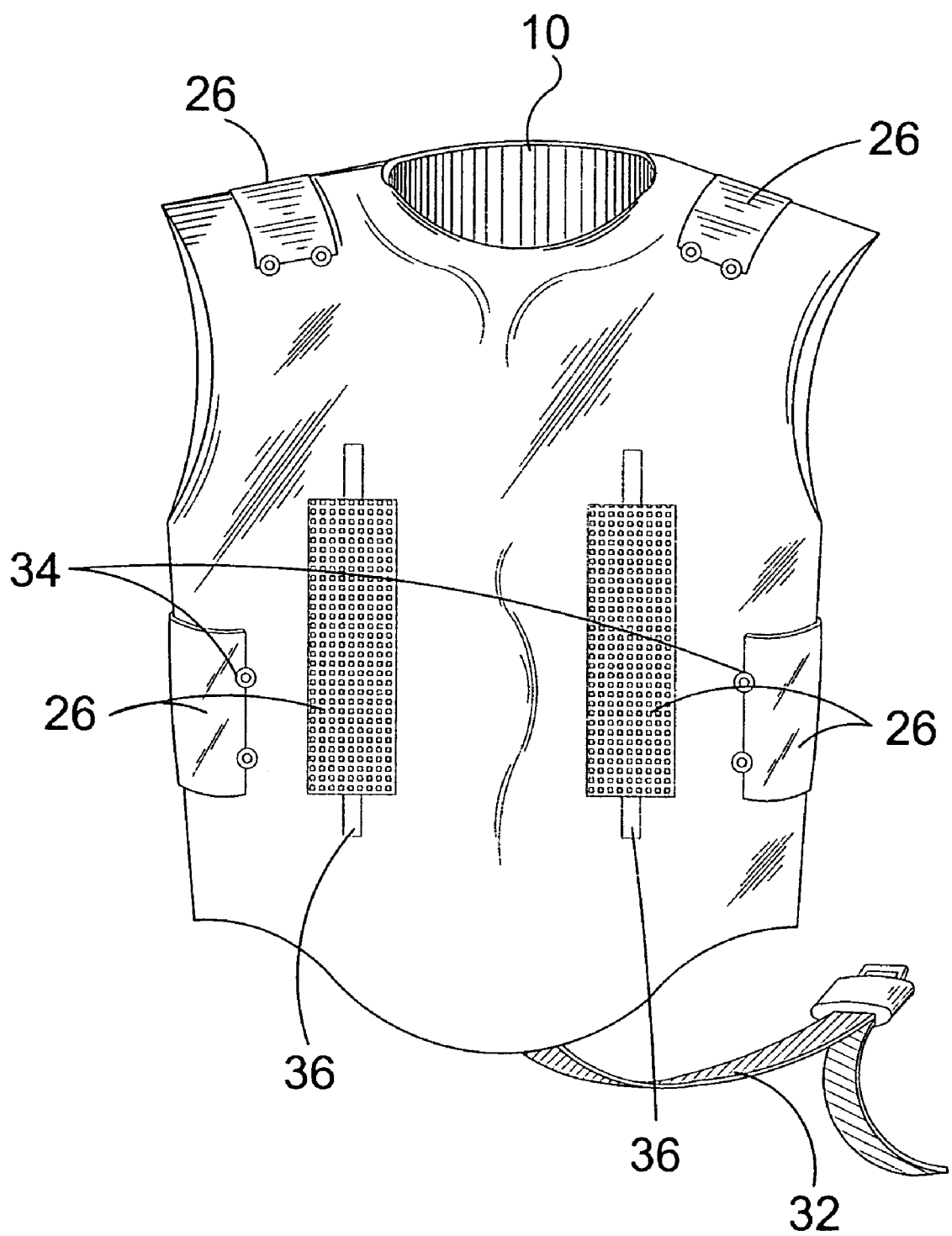
FIG. 8 is a rear view of the present invention.

Turning to FIG. 8, shown therein is a rear view of the present invention 10. Shown is a rear view of the present invention 10 disclosing a safety vest, portable restraining system designed to protect a child in the back seat of a taxi cab, limousine, or car should a child safety seat not be available or practical. The device 10 provides means for separating a seat belt comprising a lap and shoulder belt for either a left or right seated passenger, the means also insuring the continued separation of the belts during use. A first and second closure means comprising a zipper and hook and loop fastening device will prevent possible fouling of the zipper due to g-forces occurring during an accident and a quick release, which can be initiated by small children as opposed to mechanical locks that they may be unfamiliar with. Also shown are flaps 26, snaps 34, belt slots 36 and crotch harness 32.

We claim:

1. An apparatus for restraining a child with the lap belt and shoulder belt portions of a seat belt of a vehicle, comprising:
   a) a safety vest having a front, a rear, first and second sides, and an upper and a lower end for being worn on an upper torso of a child, wherein said safety vest has an inside and outside;
   b) closure means being disposed on said front of said safety vest whereby the vest can be placed on the child and then removed from the child; and, c) first and second spaced and vertically extending slots being disposed on said rear of said safety vest so that the lap belt and shoulder belt portions of the seat belt pass through said first and second slots, said first slot having a separator for separating the lap belt and shoulder belt portions of the seat belt, wherein said first and second slots extend from said outside to said inside of said safety vest so that said first and second slots pass entirely through said safety vest and said seat belt passes between the child and the rear side of said vest and between the first and second slots, wherein said second slot also has a separator whereby said vest is usable for either side of a left or right seated passenger and each separator comprises hook and loop material on each of said first and second slots so that said hook and loop material bridges across opposite sides of said outside portion of each of said first and second slots leaving end portions of said slots open to separate the lap portion from the shoulder portion of the seat belt.

2. The apparatus of claim 1, wherein said safety vest is sleeveless.

3. The apparatus of claim 2, wherein said closure means comprises a zipper being disposed on said front of said safety vest, said zipper extending from said lower end to said upper end of said safety vest.

4. The apparatus of claim 3, wherein said closure means comprises a first hook and loop material flap being disposed on said front of said safety vest, said first hook and loop material flap extending parallel to said zipper from said lower end to said upper end of said safety vest.

5. The apparatus of claim 4, further comprising a single crotch strap having first and second ends, said first end being fixedly connected to said lower end of said rear of said safety vest, said second end being removably connected to said lower end of said front of said safety vest so that said safety vest is secured to the child.

6. The apparatus of claim 5, further comprising a quick release coupling being disposed on said second end of said crotch strap so that said crotch strap can be quickly connected and then disconnected by the child.

7. The apparatus of claim 6, further comprising a second adjustable hook and loop material flap being disposed on each of said first and second sides of said safety vest so that a size of said safety vest can be adjusted to fit the child.

8. The apparatus of claim 7, further comprising a plurality of first snaps for attaching said second adjustable hook and loop material flap to said safety vest.

9. The apparatus of claim 8, further comprising a third adjustable hook and loop material flap being disposed on each shoulder of said safety vest so that the size of said safety vest can be adjusted to fit the child.

10. The apparatus of claim 9, further comprising a plurality of second snaps for attaching said third adjustable hook and loop material flap to said safety rest.

11. The apparatus of claim 1, wherein said safety vest is portable from one vehicle to another vehicle.

* * * * *